United States Patent Office 3,053,362
Patented Sept. 11, 1962

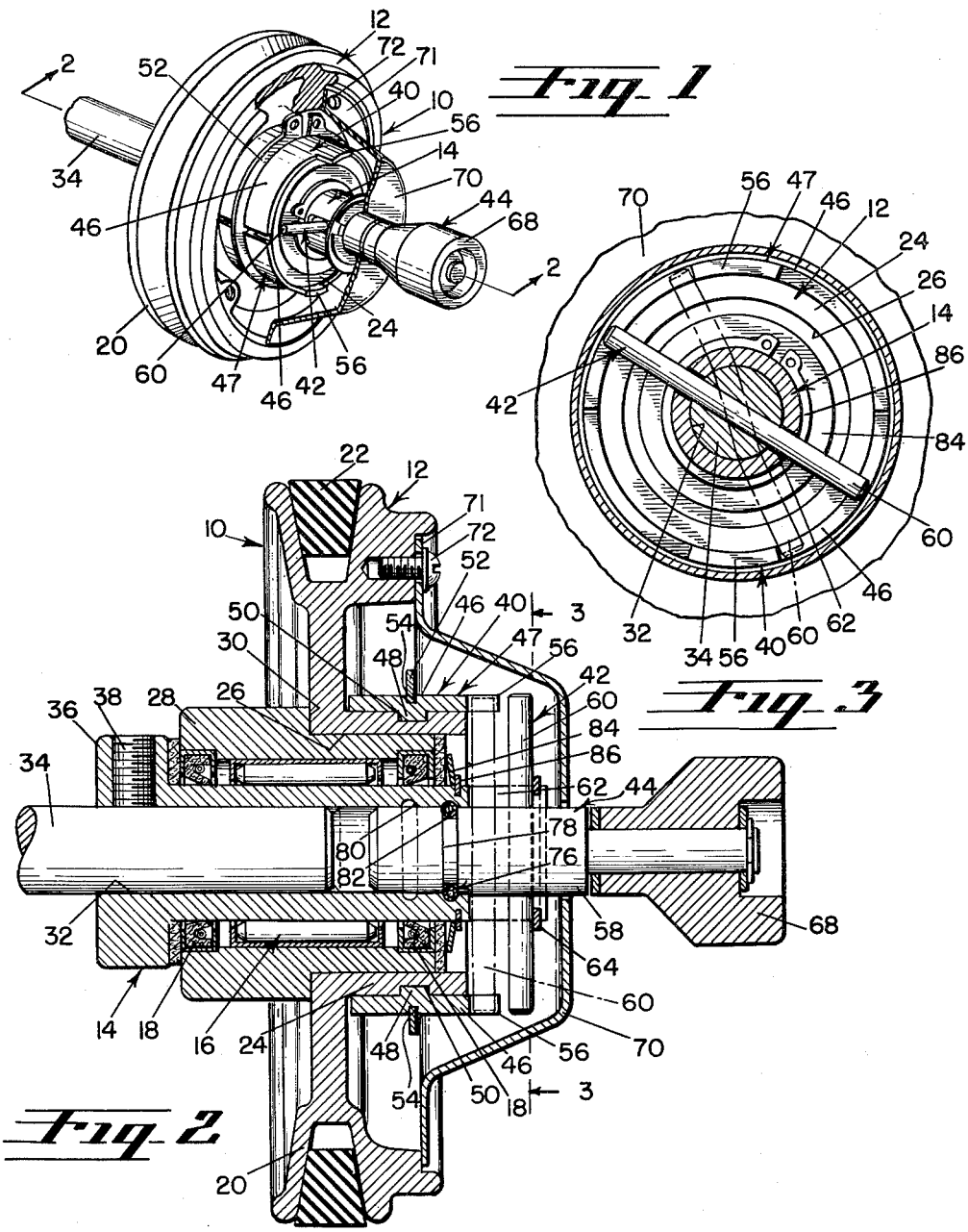

3,053,362
CLUTCH
Warren Doble, North Hollywood, and Frank H. Sully, La Mirada, Calif., assignors to Jabsco Pump Company, Burbank, Calif., a corporation of California
Filed July 28, 1958, Ser. No. 751,492
1 Claim. (Cl. 192—55)

The present invention relates in general to clutches and, more particularly, to a clutch of the dog type, a primary object of the invention being to provide a clutch of this character which is capable of engagement with minimum shock, which is simple and compact, and the operating parts of which are completely enclosed. The present application is a continuation in part of our co-pending application Serial No. 678,950, filed August 19, 1957, now Patent No. 3,005,528, granted October 24, 1961.

Generally speaking, the invention contemplates a clutch which includes coaxial driving and driven rotary members respectively carrying interengageable clutch means, one of the clutch means being movable axially relative to the rotary member by which it is carried into engagement with the other clutch means. Such axial movement of the movable clutch means is effected by an actuating means operatively connected to the movable clutch means and axially movable between engaged and disengaged positions relative to the rotary member by which the movable clutch means is carried.

One object of the invention is to provide for slippage between one of the clutch means and the rotary member by which it is carried so as to minimize shock upon engagement of the two clutch means. More particularly, an object in this connection is to provide a slippable clutch means comprising annular shoe means biased into frictional engagement with the corresponding rotary member by an annular spring means. With this construction, when the actuating means is moved into its engaged position to interengage the two clutch means, the shoe means slips circumferentially relative to the rotary member which it contacts so as to minimize engagement shock, which is an important feature.

Another object of the invention is to make one of the clutch means a spring capable of flexing upon engagement with the other clutch means so as to further minimize engagement shock. An object in this connection is to provide a clutch wherein one of the clutch means comprises a diametrical spring pin carried by the actuating means, the ends of this spring pin respectively being engageable with diametrically opposed jaws forming the other clutch means so as to transmit rotation between the two rotary members. With this construction, the spring pin flexes upon engagement of the ends thereof with the respective jaws of the other clutch means to supplement the action of the slippable shoe means in absorbing shock.

Another and important object of the invention is to provide a clutch wherein the two clutch means are completely enclosed by a generally cup-shaped cover which is mounted on one of the rotary members and through which the actuating means axially extends.

The foregoing objects, advantages, features and results of the present invention, together with various other objects, advantages, features and results thereof which will be evident to those skilled in the clutch art in the light of this disclosure, may be attained with the exemplary embodiment of the invention described in detail hereinafter and illustrated in the accompanying drawing, in which:

FIG. 1 is a perspective view of a clutch which embodies the invention;

FIG. 2 is an enlarged, longitudinal sectional view of the clutch of FIG. 1 taken in the plane of the arrowed line 2—2 of FIG. 1; and FIG. 3 is a transverse sectional view of the clutch of FIGS. 1 and 2 taken in the plane of the arrowed line 3—3 of FIG. 2.

The clutch illustrated in the drawing is designated generally by the numeral 10 and is shown as including coaxial outer and inner rotary members 12 and 14, the outer rotary member 12 being regarded as a driving member herein and the inner rotary member 14 being regarded as a driven member. The driving member 12 is rotatably mounted on the driven member 14 by means of a bearing 16 of any suitable type disposed therebetween, suitable seals 18 being provided between the driving and driven members at the respective ends of the bearing to enclose the latter.

In the construction illustrated, the driving member 12 includes a pulley 20 having a V-belt 22 trained therearound. The V-belt 22 may be driven by any suitable power source, not shown, such as the engine of a boat, for example. As will be apparent, the driving member 12 is driven continuously through the pulley 20 and the V-belt 22 as long as the power source which drives the V-belt is operating.

The pulley 20 is provided with an axially extending, cylindrical flange 24 defining an axial bore 26 in which a reduced-diameter portion of a hub 28 is disposed, this hub forming part of the driving member 12 and being separated from the driven member 14 by the bearing 16 and the seals 18. The side of the pulley 20 opposite the cylindrical flange 24 thereon is seated against an annular shoulder 30 on the hub 28 and the reduced-diameter portion of the hub is pressed into the bore 26 in the pulley to provide a rotation transmitting connection between the pulley and the hub to render these elements a single unit in effect. However, it will be understood that the pulley 20 and the hub 28 may be keyed together in other ways. If desired, the hub 28 may also be an integral part of the driving member 12.

The driven member 14 is provided with an axial bore 32 in one end of which is disposed a shaft 34 to be driven by the clutch 10. This shaft may, for example, be the shaft of a bilge pump, not shown, of a boat. The driven member 14 is provided with a head 36 carrying a set screw 38 for transmitting rotation between the driven member and the shaft 34, although again the shaft and the driven member may be keyed together in other ways.

The driving member 12 carries a clutch means 40 which is engageable by a complementary clutch means 42 carried by the driven member 14 to transmit rotation of the driving member 12 to the driven member 14, the clutch means 42 being axially movable into and out of engagement with the clutch means 40 by an actuating means 44. The clutch means 42 is shown in its disengaged position by solid lines in FIG. 2 and is shown in its engaged position by broken lines in this figure.

Considering the clutch means 40 on the driving member 12, it includes two diametrically opposite shoes 46 which are shown as substantially semiannular and which, together, form an annular, or substantially annular, shoe means 47 encircling the cylindrical flange 24 of the pulley 20. However, the angular extents of the shoes 46 may be less than 180° and the shoe means 47 will still be effectively annular, or substantially so. The shoes 46 are provided internally thereof with aligned ribs 48 disposed in an external annular groove 50 in the cylindrical flange 24. Providing the shoes 46 with the internal ribs 48 disposed in the external annular groove 50 in the cylindrical flange 24 in this fashion permits relative rotation between the driving member 12 and the shoes 46, but prevents relative axial movement therebetween.

The shoes 46 are biased into frictional engagement with the cylindrical flange 24 of the driving member 12 or, more accurately, the cylindrical flange 24 of the pulley 20, by an annular spring means 52. In the particular construction illustrated, this annular spring means consists of a snap ring disposed in aligned external grooves 54 in the shoes 46. However, it will be understood that other spring means may be substituted for the snap ring 52. As will be explained in more detail hereinafter, the shoes 46 may slip relative to the cylindrical flange 24 upon engagement of the clutch means 40 and 42 to minimize shock resulting from such engagement, which is an important feature.

The clutch means 40 further includes two diametrically opposed dogs or jaws 56 which extend axially from the shoes 46, respectively. These jaws are engageable with the movable clutch means 42 on the driven member 14 when the movable clutch means is in its engaged position.

Considering the movable clutch means 42 and the actuating means 44 in more detail, the latter includes an actuator 58 disposed in and movable axially of the bore 32 in the driven member 14, the actuator being disposed in the opposite end of the bore 32 from the shaft 34. The movable clutch means 42 consists of a diametrical spring having the form of a flexible and resilient drive pin 60 which extends diametrically through the actuator 58 and projects radially therefrom on opposite sides thereof. The length of the spring drive pin 60 is such that the ends thereof are respectively engageable with diametrically opposite sides of the jaws 56, as best shown in FIG. 3 of the drawing, thereby transmitting rotation of the driving member 12 to the drive pin 60 and the actuator 58. Such engagement between the drive pin 60 and the jaws 56 occurs when the actuator 58 is in an engaged position, shown in broken lines in FIG. 2. When the actuator 58 is in a disengaged position, shown in solid lines in FIG. 2, the ends of the drive pin 60 clear the jaws 56, i.e., are spaced axially from the jaws, to prevent engagement of the drive pin and the jaws. The drive pin 60, being a spring, flexes upon engagement of the ends thereof with the respective jaws 56 to supplement the shock absorbing action resulting from slippage of the shoes 46 relative to the cylindrical flange 24.

In order to transmit rotation between the drive pin 60 and the driven member 14, the drive pin is disposed in and movable axially of a diametrical, axially extending slot 62 in one end of the driven member 14. As will be apparent, the drive pin 60 engages the walls of the slot 62 to transmit rotation of the drive pin to the driven member 14. Thus, the drive pin performs the dual function of acting as the clutch means 42 and of providing a keyed, axially slidable connection to the driven member 14. Withdrawal of the drive pin 60 from the slot 62, and, consequently, withdrawal of the actuator 58 from the bore 32, are prevented by a snap ring 64 which encircles the driven member 14 and closes the outer end of the slot.

Considering the manner in which the actuator 58 is moved between its engaged and disengaged positions to move the drive pin 60 into and out of engagement with the jaws 56, the actuator is provided with an axially outwardly extending stem 66 which has an actuating knob 68 rotatably mounted thereon. As will be apparent, the actuator may be moved between its engaged and disengaged positions by pushing inwardly and pulling outwardly on the actuating knob 68.

For safety reasons, and to protect these parts, the drive pin 60 and the jaws 56 are enclosed by a cover in the form of a cup 70 through the base of which the actuator 58 extends. The cup 70 is provided with an annular rim or flange 71 concentric with and seated against the pulley 20 and suitably connected thereto, as by screws 72. The cup 70 thus rotates with the driving member 12. If desired, a suitable seal, not shown, may be disposed between the base of the cup 70 and the actuator 58.

In order to definitely locate the engaged and disengaged positions of the actuator 58 and the drive pin 60, a spring detent means 76 engaging the actuator and the driven member 14 and adapted to releasably lock the actuator in either its engaged position or its disengaged position is provided. The spring detent means 76 comprises an annular coil spring disposed in an external annular groove 78 in the actuator 58 and insertable into either of two internal annular grooves 80 and 82 in the driven member 14. The groove 80 corresponds to the engaged position while the groove 82 corresponds to the disengaged position.

Any tendency of the axial forces applied to the actuator knob 68 to produce relative axial movement of the driving and driven members 12 and 14 is prevented by disposing the hub 28 of the driving member 12 between the head 36 on the driven member 14 and a washer 84 which encircles the driven member 14 at the opposite end of the hub 28 from the head 36 and which is retained by a snap ring 86.

Considering the operation of the clutch 10 of the invention, it will be apparent that when the actuator 58 is in its disengaged position, as shown in solid lines in FIG. 2 of the drawing, the driving member 12 may rotate freely without transmitting rotation to the driven member 14 since the drive pin 60 is in a position such that it is cleared by the jaws 56 as they rotate. In order to engage the clutch 10, the operator merely presses inwardly on the actuator knob 68. This results in radial compression of the detent spring 76 sufficient to permit movement thereof from the annular groove 82 to the annular groove 80, whereupon this spring expands radially to releasably lock the actuator in its engaged position. As the actuator 58 is moved into its engaged position in this manner, the drive pin 60 is moved axially into a position wherein the ends thereof are engageable by the respective jaws 56. When rotating jaws 56 strike the ends of the drive pin 60, the frictional engagement between the shoes 46 and the cylindrical flange 24 resulting from the inward biasing action of the snap ring 52 on the shoes permits slippage of the shoes relative to the flange 24 until the driven member 14, the shaft 34 and the apparatus driven by the shaft are brought up to speed. Such slippage may occur throughout anywhere from a fraction of a revolution to several revolutions of the pulley 20 and greatly minimizes the shock which would otherwise result from engagement of the jaws 56 with the ends of the drive pin 60, which is an important feature. Since the drive pin is an elastic member, as hereinbefore discussed, it also flexes somewhat as the ends thereof are struck by the jaws 56. The flexure of the drive pin 60 upon engagement by the jaws 56, which flexure is shown in somewhat exaggerated from in broken lines in FIG. 3, also reduces the shock incident to engagement of the jaws and the drive pin.

Disengagement of the clutch 10 to interrupt rotation transmission between the driving member 12 and the driven member 14 is achieved merely by pulling outwardly on the actuating knob 68 to disengage the drive pin 60 from the jaws 56, the detent spring 76 moving from the groove 80 to the groove 82 as this occurs. It is thought that the manner in which disengagement of the clutch 10 occurs will be apparent so that a further discussion is not necessary.

It should be pointed out that the detent spring 76 plays an important function in that a relatively large push force must be applied to the actuating knob 68 to compress the detent spring sufficiently to permit its withdrawal from the groove 82. Because of this relatively large push force, the actuator 58 moves all the way from its disengaged position to its engaged position as soon as the spring detent 76 leaves the groove 82. Consequently, the drive pin 60 moves rapidly into full engagement with the jaws 56 to prevent the chattering of the jaws against the drive pin which might result were the drive pin moved into the engaged position slowly.

The invention thus provides a simple and compact clutch which greatly minimizes the shock incident to engagement thereof and the operating parts of which are fully enclosed.

Although an exemplary embodiment of the invention has been disclosed herein for purposes of illustration, it will be understood that various changes, modifications and substitutions may be incorporated in such embodiment without departing from the spirit of the invention as defined by the claim which follows.

What is claimed is:

In a clutch, the combination of:

(a) coaxial driving and driven rotary members;

(b) two interengageable clutch means respectively carried by said rotary members;

(c) one of said clutch means being an axially movable clutch means movable axially, relative to the rotary member by which it is carried, into and out of engagement with the other of said clutch means;

(d) one of said clutch means including circumferentially spaced clutch elements and the other of said clutch means including an equal number of circumferentially spaced shoes carried by the corresponding one of said rotary members;

(e) said shoes being circumferentially slidable relative to that one of said rotary members by which said shoes are carried and being circumferentially movable relative to each other;

(f) said shoes respectively having jaws respectively engageable with said clutch elements;

(g) the circumferential spacings between said shoes being small as compared to the circumferential extents of said shoes so as to maintain the circumferential spacings of said jaws substantially constant while permitting small variations therein;

(h) spring means engaging said shoes and biasing said shoes into frictional engagement with that one of said rotary members by which said shoes are carried; and (i) actuating means operatively connected to said axially movable clutch means for moving said axially movable clutch means axially into and out of engagement with the other of said clutch means.

References Cited in the file of this patent

UNITED STATES PATENTS

| | | |
|---|---|---|
| 321,656 | Stolterfoht | July 7, 1885 |
| 1,074,959 | Kreiling | Oct. 7, 1913 |
| 1,141,648 | Mitchella | June 1, 1915 |
| 1,231,341 | Dufour | June 26, 1917 |
| 1,261,763 | Cameron | Apr. 9, 1918 |
| 1,659,311 | Candee | Feb. 14, 1928 |
| 1,746,764 | Carhart | Feb. 11, 1930 |
| 1,952,232 | Axien | Mar. 27, 1934 |
| 2,233,705 | Hook | Mar. 4, 1941 |
| 2,451,730 | Greenlee | Oct. 19, 1948 |
| 2,658,410 | Livers | Nov. 10, 1953 |
| 2,675,835 | Kiekhaefer | Apr. 20, 1954 |
| 2,700,442 | Gorske | Jan. 25, 1955 |
| 2,755,900 | Seyfried | July 24, 1956 |